United States Patent

Seaberg

[15] 3,670,688
[45] June 20, 1972

[54] COMPOSITE VALVE STEM

[72] Inventor: Lewis A. Seaberg, 7401 Humboldt Ave. S., Minneapolis, Minn. 55423

[22] Filed: March 2, 1971

[21] Appl. No.: 120,121

[52] U.S. Cl. .............................. 116/34, 73/146.8, 137/227
[51] Int. Cl. ............................................................. B60c 23/02
[58] Field of Search .................... 73/146.3, 146.8; 116/34; 158/427; 137/224, 227, 228

[56] References Cited

UNITED STATES PATENTS

| | | | |
|---|---|---|---|
| 1,482,947 | 2/1924 | Shorts | 137/227 |
| 1,803,270 | 4/1931 | Morrison | 137/227 |
| 3,230,968 | 1/1966 | Struby | 137/227 |

Primary Examiner—Harold W. Weakley
Attorney—Robert C. Baker

[57] ABSTRACT

A pressure-indicating composite valve stem for mounting in the valve stem opening of tubeless tire rims is taught. The valve stem includes a central rigid tubular stem member. A barrel housing extends about or around a portion of the length of the central tubular member, forming an elongated annular cavity about the tubular member. A lateral port in the wall of the central tubular member communicates with this cavity. The barrel housing has an annular band transparent window permitting view of pressure indicia within the barrel housing. A significant portion of the central tubular member extends below the barrel housing and is firmly bonded to a unitary elastic body. This elastic body also is firmly bonded to the lowermost portion of the barrel housing and forms a hermetic seal over the junction at the inner or lowermost end of the barrel and the tubular member. The elastic body is also provided with a neck portion and head portion for mounting purposes in the tubeless tire rim.

Within the cavity between the barrel housing and tubular member is a pressure-indicating assembly which includes a ring piston, a coil spring forcing the piston toward the bottom of the cavity nearest the rim mounting, a sleeve-like visual pressure indicator fixed to the piston and viewable through the window of the barrel housing, movable seals for maintaining an air tight condition as the piston slides, stop member to limit the motion of the piston, and means permitting atmospheric air passage from and to the outer end of the cavity as the piston slides therein.

4 Claims, 3 Drawing Figures

PATENTED JUN 20 1972   3,670,688

INVENTOR.
LEWIS A. SEABERG
BY
ATTORNEY

COMPOSITE VALVE STEM

This invention relates to a new pressure-indicating composite valve stem for mounting in the valve stem opening of tubeless tire rims.

A variety of tubeless tire valve stems have been used heretofore; but none is known which incorporates the feature of visually indicating the tire pressure or degree of inflation.

The present invention provides a new type of composite valve stem for tubeless tires. This valve stem indicates, as by color coding, whether a tire is under overinflation, normal or subnormal inflation pressures. An especially important feature of the invention is that the color coding is such that approximate tire pressures may be determined by a mere quick glance while an individual stands upright, or as he walks toward his automobile to climb into it. Thus, proper tire inflation for safety and maximum wear, with proper traction and improved gas mileage, may be conveniently checked at frequent intervals without the delays inherent in having to employ a special tool for that purpose. Still further, the new valve stem hereof has only a minimal effect on wheel balance. It is very analogous in total size and weight to standard weights and sizes for tubeless tire valve stems.

Other significant advantages of the invention will become evident from a brief summary description of it. In describing the composite valve stem hereof, the end of it which is fastened at the rim for a tubeless tire is referred to as the inner end; and the end farthest outwardly from the rim and through which inflation is accomplished is referred to as the outer end. By keeping these relationships in mind, the various elements of structure will be more quickly understood.

This composite valve stem comprises, first of all, a central rigid tubular stem member, the outer end of which is adapted to removably receive a valve core assembly. A barrel housing extends around a portion of the tubular member intermediate the ends of that member. This barrel housing terminates at its inner end so that a significant portion of the inner end of the tubular member projects free of the barrel housing and is available for firm bond to an elastic body. The barrel housing defines an elongated cavity surrounding the tubular member. A lateral port in the wall of the tubular member communicates with this cavity near the inner end thereof. An important feature of the barrel housing is that it has an annular band-like window of transparent material spaced from the outer end of the barrel housing but located in the outermost three-fifths of the length of the barrel housing. It is through this window that glance visual inspection of tire pressures is accomplished.

A critical feature of the composite valve stem is that it includes a unitary elastic body as part of it. The outer portion of this elastic body annularly surrounds and is firmly bonded both to the exterior surface of the projecting inner end of the tubular member throughout at least most of that projecting length as well as to the exterior surface of at least about one-fifth of the length of the barrel housing adjacent the inner end of the tubular member. The bonding of this elastic body to those surfaces is such as to form a hermetic seal over the junction of the inner end of the barrel housing and the tubular member. Further, the elastic body has a neck portion and an enlarged head portion aligned and projecting from the inner end of the tubular stem member. A central port extends through the neck end and head portion of the elastic body. This port is aligned with the inner end of the tubular stem member and communicates with it.

All portions of the composite valve stem of the invention, other than the head portion of the elastic body, are of a total diameter and character adaptable to be pressed through the valve stem opening in the tire rim. The portion of the elastic body nearest the inner end of the tubular member and adjacent the neck portion of the elastic body itself is sufficiently greater in size than the valve stem opening in the rim so that it is subjected to stretching and compression forces as it is pressed through the valve stem opening. However, after being pressed therethrough, this portion expands to its normal size and assists in holding the composite valve stem in position on the rim. The neck portion of the elastic body is of a size sufficiently greater than the valve stem opening to remain under such compression as to form a hermetic seal between it and the rim when this neck portion is lodged in the valve stem opening. The head portion of the elastic body abuts against one side of the tire rim at the valve stem opening when the neck portion is lodged in that opening.

A pressure-indicating assembly is contained within the cavity defined between the barrell housing and the central tubular member. This assembly includes a ring piston which is positioned annularly about the tubular member. Mechanical means press this piston toward the inner end of the cavity; but this mechanical means is yieldable under air pressure to allow sliding motion of the piston within at least approximately the inner two-fifths of the length of the cavity. Further, at least this inner end of the cavity, within which the piston is slidable, is hermetically tight. Fixed to this piston is a sleeve-like visual pressure-indicator which is viewable through the window of the barrel housing. The pressure-indicator is color coded to indicate, for example, overnormal, normal and subnormal pressures for glance visual reading through that window. Movable seal means are provided for sealing against air escape between the slidable piston and the tubular stem member as well as between the slidable piston and the barrel housing. Further, means are provided to stop outward sliding movement of the piston short of or before it moves past the window in the housing. Also, means are provided to stop inward movement of the piston short of or before it passes over and plugs the lateral port in the tubular stem member.

A further feature is that means are provided so that passage of atmospheric air is permitted from and to the outer end of the cavity formed by the barrel housing. This is necessary to avoid back pressures and false pressure readings; and such air passage occurs as the piston slides within the cavity of the housing.

The invention will further be described by reference to a drawing, the disclosure of which is herein incorporated by reference. In the drawing.

Figure 1:
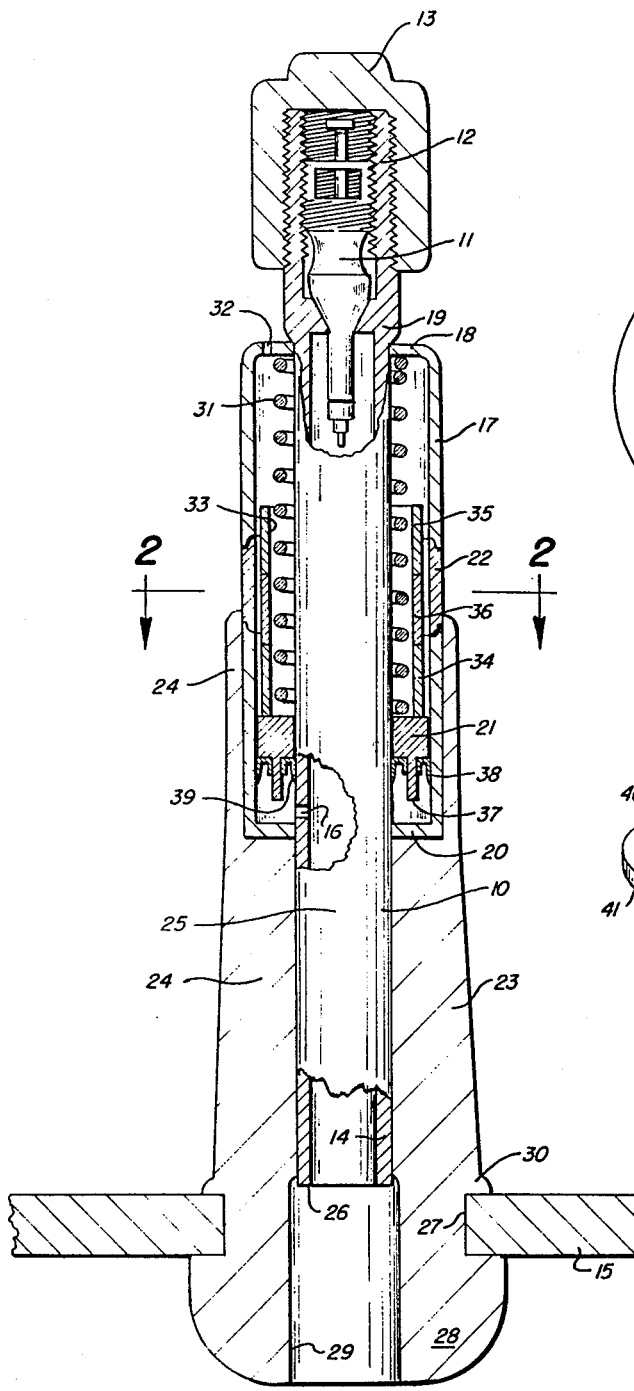
FIG. 1 is a schematic vertical sectional view through the composite valve stem of the invention, showing, however, a plan view of the central tubular stem member except for several parts of it which are broken away to reveal interior elements.
Figure 2:
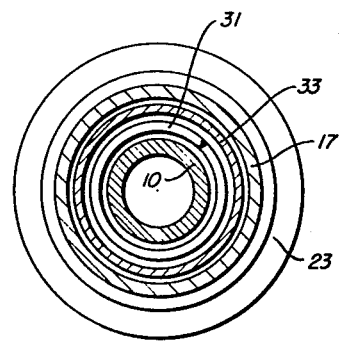
FIG. 2 is a schematic sectional view taken on lines 2—2 of FIG. 1.

The central rigid tubular stem member 10 of the composite valve stem hereof may be of conventional manufacture. It ordinarily comprises a hollow rigid tube, suitably of brass, the outer end of which is adapted to removably receive a valve core assembly 11. The elements of the valve core assembly and the tubular member are well known and may be of conventional manufacture in practicing the invention. The outer end 12 of the tubular stem member suitably is threaded and a removable threaded cap 13 may be placed over it, as is conventional. The inner end 14 of the tubular member terminates approximately at the tire rim 15 as the composite valve stem of the invention is mounted in a valve stem opening of a tubeless tire rim. Whether the inner end 14 of the tubular stem member projects into the valve stem opening of the tire rim 15 when the composite valve stem of the invention is mounted therein, or terminates apart from or short of that valve stem opening, is not a material part of the invention. Thus, the termination of the inner end 14 is broadly characterized as being approximately at the rim 15. If desired, the inner end 14 of the tubular member may be smaller in diameter than adjacent portions of it; and the change of diameter in this portion may be abrupt or gradual. The length of the tubular member ordinarily will be at least 4 centimeters, and usually 5 or 6 centimeters up to possibly 7 or 8 centimeters. It must be of sufficient length to accommodate the barrel housing 17, to be discussed, as well as to extend inward sufficiently for a firm bond to the elastic body, to be discussed.

A significant feature of the tubular stem member is that it has a lateral port 16 through the wall thereof for lateral passage of air; and the importance of the location of this lateral port will be explained below.

A barrel housing 17 extends about or around the portion of the tubular member 10 intermediate the ends of that member. Specifically, the barrel housing 17 at its outer end 18 terminates suitably at a location short of the normally threaded end 12 of the tubular member. It may suitably terminate at a shoulder 19 adjacent the threaded end, provided the tubular member includes such a shoulder. The inner end 20 of the barrel housing will normally terminate at least 1.5 cm. and preferably at least about 2.0 cm. from the inner end of the central tubular member. Thus at least 1.5 cm. and preferably even 2.0 cm. of the inner end portion of the tubular member 10 is free of the barrel housing. In essence, a significant section of the tubular member 10 must be exposed beyond the inner end 20 of the barrel housing so as to permit secure bonding of the tubular member to the elastic body, as will be explained.

The barrel housing 17 defines an annular elongated cavity which surrounds the tubular member 10. Thus a cavity between the housing 17 and tubular member 10 is formed. To be noted is that the lateral port 16 in the tubular member 10 is in communication with the cavity of the barrel housing 17 near the inner end thereof, that is below the piston 21 within the cavity.

The barrel housing 17 also is provided with an annular window 22, in the nature of a band or ring; and this window is of transparent material. Suitably, this window is formed of transparent rigid material such as an acrylic or polycarbonate plastic or the like. While it may be formed of glass, the preferable materials to employ are those known as organic plastics. Indeed, if desired, the entire barrel housing may be formed of plastic material such as polycarbonate, although the parts other than the window will normally be formed of metal such as brass or the like. The window suitably may be fixed in the barrel by a threaded joint or by adhesive bonding, especially thermoset or cross-linked adhesive bonding. Where the entire barrel is formed of plastic, the portions of it apart from the window 22 may be rendered opaque by incorporating pigment in the plastic prior to molding or by painting portions of the barrel housing other than the section referred to as the annular band window 22. The location of the annular band window is significant since it must be spaced from the outer end of the barrel housing but located in the outermost approximately three-fifths of the length of that housing. These relationships will become evident as the description for the pressure-indicating assembly within the barrel housing is set forth below.

A unitary cylindrical elastic body 23, suitably of rubber, and preferably approximately circular in cross-section, serves not only to provide the mounting structure for emplacing or mounting the composite valve stem hereof in a tubeless tire rim, but also, according to the invention, to provide suitable means for holding the barrel housing of the composite valve stem in position upon the central tubular stem member. It further serves as means for hermetically sealing the junction between the inner end 20 of the barrel housing and the adjacent tubular stem member 10. The unitary elastic body 23 has an outer portion 24 which annularly surrounds and is firmly bonded to the exterior surface of the projecting inner end 25 of the tubular member throughout at least most of the projecting length of that member. Optionally, if desired, the very terminal inner end 26 of the tubular member may be free of a firm bond of the elastic body to it; and some advantages arise when that is done, see U.S. patent to Boyer, U.S. Pat. No. 2,818,101. It is however critical that at least most of the projecting length 25 of the tubular member is firmly bonded to the elastic body. The bond between the elastic body 23 and the tubular member 25 in this portion may serve as the sole means for holding the tubular member 10 unified with the plastic or elastic body 23.

Further, the outer portion 24 of the elastic body 23 also is firmly bonded to the exterior surface of at least about one-fifth (and preferably at least about two-fifths) of the length of the barrel housing 17 adjacent the inner end of the tubular member 10. The elastic body 24 may extend up the sides of the barrel housing to a point adjacent to or slightly overlapping upon the transparent window 22. The bonding of the elastic body to both the tubular member 10 as well as the barrel housing 17 is such as to form a hermetic seal over the junction at the inner end 20 of the barrel housing, that is the "butt" end 20 of the barrel housing, and the tubular member. In effect, the junction between the "butt" end cap 20 of the barrel 17 and the tubular member 10 may be sealed hermetically solely by the elastic body material. A variety of elastic materials are suitable to employ; but cross-linked rubbery synthetics or elastic plastics are most suitable. If desired, various primers and other adhesive compositions may be applied as a thin film over the portion of the barrel housing and the tubular member to which firm bonding of the elastic body is to be accomplished. Cross-linking or heat curable priming compositions compatible with the composition of the elastic body and having specific adhesion to the material of the tubular stem and barrel housing will be used.

The unitary elastic body is provided with a neck portion 27 and an enlarged head portion 28, both of which are aligned and project from the inner end of the central tubular stem member 10. A central port 29 through the neck 27 and head 28 portions is aligned with the inner end of the tubular member 10 and communicates therewith, as is conventional.

All portions of the composite valve stem, other than the head portion 28 of the elastic body 23, are of a total diameter and character readily adaptable to be pressed through the valve stem opening in the tire rim 15. The portion 30 of the elastic body nearest the inner end of the tubular member and adjacent the neck portion 27 is sufficiently greater in size than the valve stem opening itself so that this portion 30 is subjected to stretching and compression forces as the same is pressed through the valve stem opening. However, this portion 30 expands to its normal size (in the sense that compression is released in that portion) after being pressed through the valve stem opening. If desired, the size of this part 30 of the elastic body may be formed so as to be slightly enlarged immediately adjacent the neck portion 27, so as to form a ring-like bulge or footing for the elastic body once it is mounted. The neck portion 27 of the elastic body is of a size sufficiently greater than the valve stem opening to remain under such compression in the valve stem opening so as to form a hermetic seal between it and the rim of the valve stem opening when it is lodged in that opening. The head portion 28 of the elastic body suitably abuts against one side of the tire rim 15 at the valve stem opening when the neck portion 27 is lodged in the valve stem opening.

The pressure-indicating assembly within the annular cavity formed by the barrel housing 17 includes a ring piston 21 which is located or positioned annularly about the central tubular member 10. Mechanical means such as coil spring 31 extends between the head end 18 of the barrel housing and the head of piston 21. Coil spring 31 presses against the head of the piston 21 and forces it toward the inner end portion of the cavity. This mechanical means or coil spring 31 is yieldable so as to allow sliding motion of the piston within at least the inner two-fifths of the length of the cavity. The strength of the spring may be selected, as desired, to give or yield under various air pressure conditions introduced below piston 21. To be observed is that the lateral port 16 through the wall of the tubular member 10 communicates with the cavity below the piston 21 or at the inner end of the cavity. This inner end, within which the piston is slidable, is hermetically air tight, whereas other portions of the cavity (that is the portion above the extremity of movement of the piston) must be such as to allow movement of air to and from the atmosphere. For this reason, especially when the juncture between the head end 18 of the barrel housing and the central tube member 10 is hermetically tight, which is unnecessary, an optional escape port is provided as at number 32 in the head 18 of the barrel housing.

Affixed to the piston is an upstanding sleeve-like visual pressure-indicator 33. As illustrated in the drawing, the sleeve of the pressure-indicator is annularly outward from the coil spring 31 within the cavity; and this relationship permits location of the window 22 at a near maximum outward location from the tire rim 15. The pressure-indicator is viewable through the window 22 of the barrel housing. It suitably is provided with color coded sections which indicate overinflation, normal and subnormal inflation pressures. For example, the pressure-indicator may have a section or band nearest the piston 21 which is color coded green 34; a section or band farthest from the piston which is color coded red 35; and a section or band intermediate the green and red sections which may be color coded yellow 36. Thus, when the tire is under normal inflation pressures, piston 21 will be forced upwardly or outwardly against spring 31 by virtue of the air pressure communicated under piston 21 in the cavity; and this will cause, for example, the yellow section 36 of the indicator to be viewable through the window 22. To be observed is that the spacing of window 22 from the head end 18 of the housing is such as to at least accommodate the red section 35 and yellow section 36 of the indicator 33 in the outward opaque portion of housing 17. This is necessary so as to permit the green section 34, indicating overinflation, from whatever cause, to be viewable through window 22. However, as tire pressure drops from normal, piston 21 is pressed by spring 31 toward the inner end of the cavity; and this causes, for example, the red band 35 to become viewable in the window. Under this condition, the motorist sees that he must add air to the tire.

Upward or outward sliding movement of the ring piston 21 is stopped short of passing the window 22 of the housing by virtue of the fact that the sleeve-like visual pressure-indicator 33 abuts against the head part 18 of the barrel housing. (To be noted is that piston 21 may in fact, under high inflation, actually enter the area of the window; but it should not completely pass the window into the portion of the housing above the window. The piston itself may be color coded to indicate an inflation condition such as overinflation.) Alternate means to prevent or limit the outward sliding movement of the piston may be employed, if desired. A projecting lug or ring member or leg 37 depends as an annular ring downwardly from a medial location on the annular piston and serves, when it abuts against the "butt" end 20 of housing 17, to stop the inward motion, or limit the inward movement, of the piston 21 short of or before the piston moves so far as to block the lateral port 16 for air communication from the tubular member into the cavity below the piston. Air communication between the tubular member and the space below the piston must be maintained at all times.

The portion of the cavity above or outward from the portion in which the piston 21 is slidable must not be air tight. Suitably, the joint between the head 18 of housing 17 and the tubular member 10 is such as to afford air passage; but a port 32 may be provided in the head 18 to insure passage of atmospheric air into and out of the outermost cavity part.

For seal purposes, the portion of the cavity walls along which piston 21 moves should be as smooth as reasonably possible. The section of tubular member 10 along which piston 21 moves should be uniform in external diameter; and likewise, the section of the interior wall of the housing 17 along which piston 21 moves should be of uniform diameter. Even such conditions provide inadequate sealing against air escape.

Figure 3:
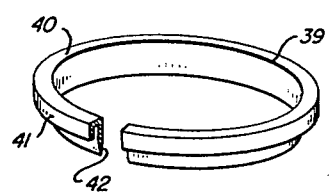
FIG. 3 is a schematic perspective view of one type of seal member for the piston of the pressure-indicating assembly.

Seal means of movable character, affixed to piston 21, seal against air escape between the slidable piston 21 and tubular member 10 as well as between slidable piston 21 and barrel housing 17. Annular seals 38 and 39 are illustrated for this purpose in FIG. 1; and the detailed character of one of these seals, namely 39 (which seals against air escape between piston 21 and tubular member 10) is illustrated in FIG. 3.

Seal 39 includes a mounting ring 40, plus an optional mounting lip guide 41, which are suitably adhesively bonded to the base end of piston 21. The lip guide 41 rests against the depending annular flange 37 along the interior thereof facing the tubular member 10. Depending from the mounting ring 40, at the edge thereof opposite lip 41, is a thin flexible curtain 42, annular or circular in character, of stretchable flexible plastic. The curtain 42 is of rubbery smooth character, suitably formed of butyl rubber. This curtain, as the seal 39 is mounted on the piston 21, depends as an extension to the piston 21 along the exterior wall of tubular member 10. It extends as a curtain along that exterior wall of the tubular member. In this portion of the cavity, the walls are hermetically tight; and the function of this curtain is to prevent leakage between the wall and piston. Air pressure in the inner part of the cavity, below piston 21, urges curtain 41 into sealing contact with the exterior of tubular member 10, but the smooth character of the wall and curtain permits sliding motion of the complete piston and sealing means. In like manner, the curtain of sealing means 38 is urged into sealing contact with the interior of the housing 17, but allows for the necessary sliding motion.

An optional feature—making unnecessary a means for stopping outward sliding movement of the piston short of passing the window in the housing—is that of providing a special port through the cavity housing wall, for example, in an area immediately adjacent or in the window 22. Such a port could serve the function of allowing overinflation air to exit as piston 21 moves above it, thereby automatically correcting overinflation of excessive character and stopping upward or outward movement of piston 21. This lateral exit port in the side-wall of housing 17 also could serve the function of port 32 aforediscussed, inasmuch as such lateral port would normally be located outward from piston 21 and allow, during most sliding motion of the piston, communication of the outer section of the cavity with the atmosphere.

It will be observed that, within the inner part of the cavity below piston 21, the air pressures are equal in force against all surfaces. Thus, the bonding of the elastic body to the barrel housing is not normally subjected to the extreme of outward thrust pressure forces to which the tubular member is subjected; and this optionally means that the strength of bond between the housing 17 and elastic body may, if desired, be less than the strength of bond between the tubular member 10 and elastic body.

That which is claimed is:

1. As a new article of manufacture: A pressure-indicating composite valve stem for mounting in the valve stem opening of a tubeless tire rim, comprising:
   i. a central rigid tubular stem member at least 4 cm. long, the outer end of which is adapted to removably receive a valve core assembly, and the inner end of which terminates approximately at the tire rim as said composite valve stem is mounted in said valve stem opening, said tubular member having a lateral port through the wall thereof for lateral passage of air,
   ii. a barrel housing about a portion of said tubular member intermediate the ends of said member, said barrel housing being characterized in that it
      a. terminates at its inner end at least 1.5 cm. from the inner end of said tubular member so that at least 1.5 cm. of the inner end of said tubular member projects free of said barrel housing,
      b. defines an annular elongated cavity surrounding said tubular member, said lateral port of said tubular member being in communication with said cavity near the inner end thereof,
      c. has an annular band window of transparent material spaced from the outer end of said barrel housing and located in the outermost three-fifths of the length of said housing,
   iii. a unitary elastic body a. having an outer portion which annularly surrounds and is firmly bonded both to the exterior surface of the projecting inner end of said tubular member throughout at least most of said projecting length as well as to the exterior surface of at least about one-fifth of the length of said barrel housing adjacent said inner end of said tubular member, the bonding of said elastic body being such as to form a hermetic seal over the junction at said inner end of said barrel housing and said tubular member, b. said elastic body additionally having a neck portion and an enlarged head portion aligned and projecting from the inner end of said tubular member, with a central port through said neck and head portions aligned with the inner end of said tubular member and communicating therewith, said composite valve stem in all portions thereof other than the head portion of said elastic body being of a total diameter and character adaptable to be pressed through said valve stem opening, said elastic body in its portion nearest the inner end of said tubular member and adjacent the neck portion being sufficiently greater in size than said valve stem opening to be subjected to stretching and compression forces as the same is pressed through said valve stem opening but expanding thereafter to its normal size, said neck portion of said elastic body being of a size sufficiently greater than said valve stem opening to remain under such compression as to form a hermetic seal between it and the rim when lodged in said valve stem opening, said head portion of said elastic body being abutted against one side of the tire rim at said valve stem opening when said neck portion is lodged in said valve stem opening, and iv. a pressure-indicating assembly within said cavity defined by said barrel housing, said assembly comprising a. a ring piston annularly about said tubular member, b. mechanical means pressing said piston toward the inner end of said cavity, said mechanical means being yieldable under pressure to allow sliding motion of said piston within at least the inner two-fifths of the length of said cavity, at least the inner end walls of said cavity within which said piston is slidable being hermetically tight and in communication with said lateral port, c. a sleeve-like visual pressure-indicator fixed to said piston and viewable through the window of said barrel housing, said pressure-indicator being color coded to indicate normal and subnormal pressures for glance visual reading through said window, d. movable seal means for sealing against air escape between said slidable piston and said tubular member as well as between said slidable piston and said barrel housing, e. means to stop outward sliding movement of said piston short of passing said window in said housing, f. means to stop inward movement of said piston short of said lateral port in said tubular member, and g. means permitting atmospheric air passage from and to the outer end of said cavity as said piston slides therein.

2. The article of claim 1, wherein the sleeve-like pressure-indicator is fixed to, and projects in an outward direction from, the head end of said piston.

3. The article of claim 1, wherein said movable seal means comprises a flexible curtain of stretchable plastic fixed to said piston as an extension along a wall portion of said cavity which is hermetically tight.

4. The article of claim 1, wherein the sleeve-like visual pressure-indicator includes a color-coded section indicating overinflation.

* * * * *